US010598306B2

(12) United States Patent
Carter et al.

(10) Patent No.: US 10,598,306 B2
(45) Date of Patent: Mar. 24, 2020

(54) METHOD AND APPARATUS FOR REPLACING UNDERGROUND PIPE

(71) Applicants: Robert Ward Carter, Alameda, CA (US); David B Crafts, Vallejo, CA (US); Maxwell Frank Darrow, Hayward, CA (US)

(72) Inventors: Robert Ward Carter, Alameda, CA (US); David B Crafts, Vallejo, CA (US); Maxwell Frank Darrow, Hayward, CA (US)

( * ) Notice: Subject to any disclaimer, the term of this patent is extended or adjusted under 35 U.S.C. 154(b) by 0 days.

(21) Appl. No.: 15/902,906

(22) Filed: Feb. 22, 2018

(65) Prior Publication Data

US 2018/0245726 A1 Aug. 30, 2018

Related U.S. Application Data

(60) Provisional application No. 62/461,929, filed on Feb. 22, 2017.

(51) Int. Cl.
*F16L 55/165* (2006.01)
*F16L 55/18* (2006.01)

(52) U.S. Cl.
CPC ........... *F16L 55/1658* (2013.01); *F16L 55/18* (2013.01)

(58) Field of Classification Search
CPC .............................. F16L 55/1658; F16L 55/18
USPC .................................................... 405/184.3
See application file for complete search history.

(56) References Cited

U.S. PATENT DOCUMENTS

| 4,732,222 | A | * | 3/1988 | Schmidt | E21B 4/06 175/22 |
|---|---|---|---|---|---|
| 5,876,152 | A | * | 3/1999 | Hesse | E21B 7/30 175/22 |
| 6,109,832 | A | * | 8/2000 | Lincoln | F16L 55/1658 175/53 |
| 6,357,967 | B1 | * | 3/2002 | Putnam | F16L 55/1658 254/29 R |
| 6,854,932 | B2 | * | 2/2005 | Putnam | F16L 55/1658 254/107 |
| 7,824,130 | B2 | * | 11/2010 | Koch | E21B 7/205 138/97 |
| 8,523,489 | B1 | * | 9/2013 | Putnam | F16L 55/1658 405/184.3 |
| 2004/0265067 | A1 | * | 12/2004 | Putnam | F16L 55/1658 405/184.3 |
| 2006/0088384 | A1 | * | 4/2006 | Putnam | F16L 55/1658 405/184.1 |
| 2007/0036613 | A1 | * | 2/2007 | Tjader | B23D 21/02 405/184.3 |
| 2011/0079469 | A1 | * | 4/2011 | Tjader | F16L 55/1658 184/14 |

(Continued)

FOREIGN PATENT DOCUMENTS

CH 680776 A5 * 11/1992 ............. B23D 21/02

*Primary Examiner* — Frederick L Lagman
(74) *Attorney, Agent, or Firm* — C. John Brannon; Brannon Sowers & Cracraft PC

(57) ABSTRACT

A pipe bursting system and method are described wherein a bursting head pulled by a cable employs a relatively small pneumatic hammer and a relatively large cable tension to impose a cyclical hoop stress on the pipe being burst to cause fatigue failure of the pipe, resulting in lower size and power requirements, and higher efficiency for a given set of job requirements.

5 Claims, 4 Drawing Sheets

(56) References Cited

U.S. PATENT DOCUMENTS

2011/0081205 A1\* 4/2011 Tjader ................ F16L 55/1658
405/184.3
2011/0250020 A1\* 10/2011 Carter ................ F16L 55/1658
405/184.3

\* cited by examiner

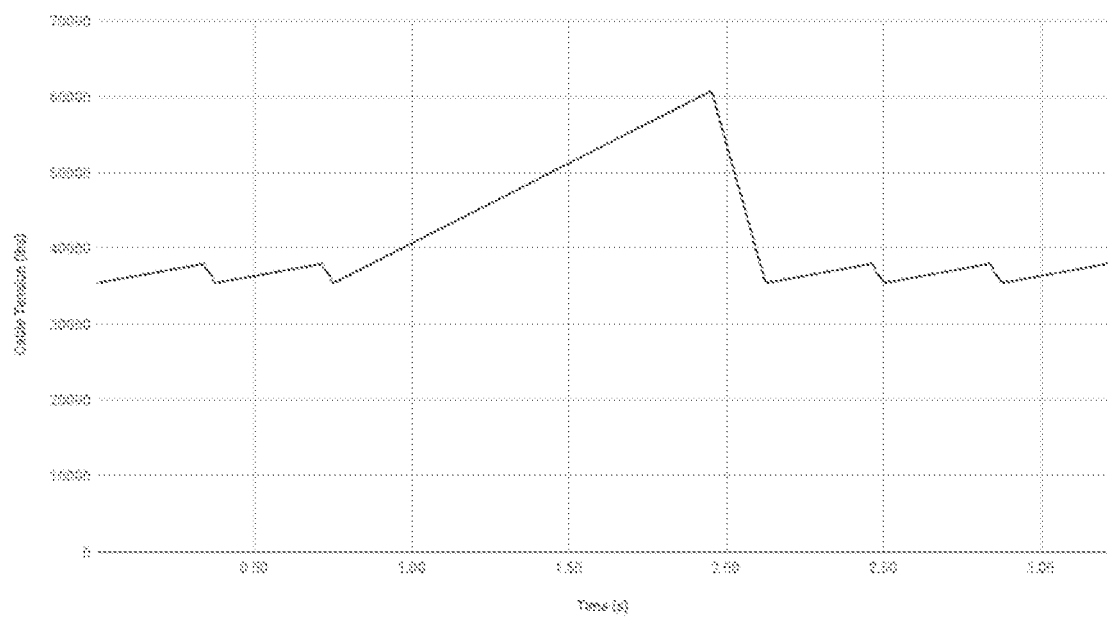
Fig. 8: Cable Tension v. Time – Static Pipe-Burst
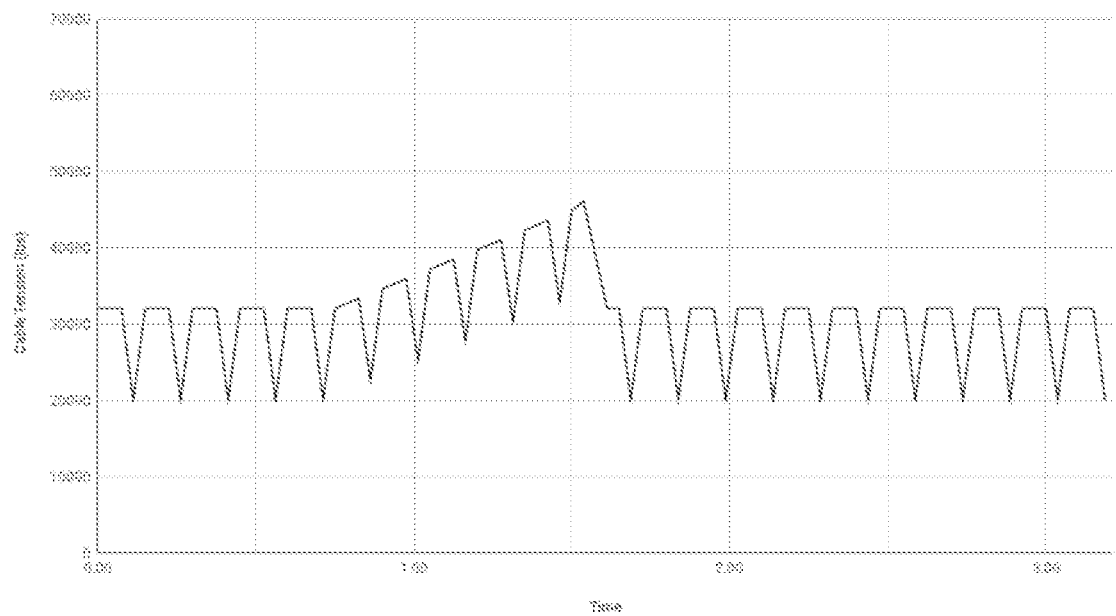
Fig. 9: Cable Tension v. Time – Impactor Pipe-Burst

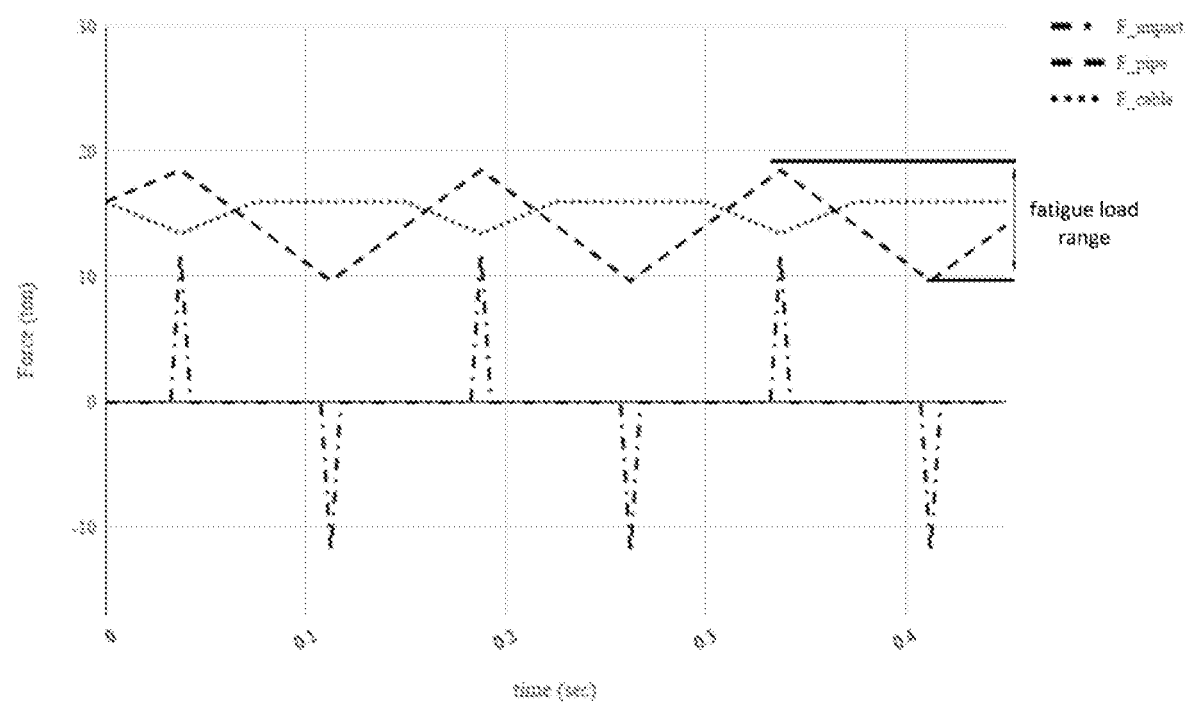

METHOD AND APPARATUS FOR REPLACING UNDERGROUND PIPE

PRIORITY

This application claims the benefit of U. S. Provisional Application No. 62/461,929, filed Feb. 22, 2017, the entirety of which is incorporated herein by reference.

FIELD OF THE INVENTION

This invention relates to the field of pipe bursting for replacing underground conduit without the need for full excavation. More particularly, the invention relates to improved methods and apparatus for pipe bursting.

BACKGROUND OF THE INVENTION

Pipe bursting is a well-known technique for replacing old underground conduit, such as ceramic or metal pipe, without having to dig a trench and remove the conduit to be replaced. (As used herein, unless otherwise noted, the term "pipe" is intended to include all types of conduit typically used in underground installations.) In pipe bursting, a bursting head, sometimes called a mole, is pushed or pulled through the pipe to be replaced to rupture (for example by fracture or by slitting) and displace the old pipe outwardly, while at the same time pulling or pushing a replacement pipe behind it (typically high density polypropylene) to occupy the space left by the displaced old pipe. The bursting head typically includes a tapered, roughly frusto-conical, outer geometry which contacts the pipe in generally coaxial alignment. When the bursting head is moved axially, the outer surface imparts force to the pipe, including a radially outward component, thereby producing a hoop stress in the pipe. When the hoop stress exceeds the tensile strength of the pipe material, the pipe is ruptured. Irregularities, such as cutting blades, may be provided in the outer surface of the bursting head to create regions of higher stress to assist in fracturing or in slitting the old pipe lengthwise.

A particularly useful type of pipe bursting system employs a wire cable to pull the bursting head, wherein the cable is pulled, either intermittently or continuously, with enough force to cause the bursting head to burst the pipe. This process is sometimes referred to as "static" bursting because the load placed upon the pipe by the bursting head, although variable, usually varies little compared to its magnitude during the normal bursting process. To pull the cable, the cable is grasped by one or more grippers, namely, devices which periodically grip and release the cable. The grippers are mounted on and moved by a hydraulically movable structure, such as a so-called bridge, or other suitable movable support such as a rocker arm, or lever. (Although winches can be used for static bursting, the power requirements typically necessitate the use of large and unwieldy equipment. Moreover, the pulling power typically varies as the cable is wound around the drum of the winch, which is undesirable and may require the addition of capstans.) During a recovery stroke, the gripper or grippers are released and returned to their original position for the next pulling stroke. An additional gripper or grippers may be used to hold the cable in a fixed position or to take over the pulling function (i.e. as a continuous puller), while the released gripper is returning to its original position. Thus, in a series of pulling strokes somewhat similar to a person pulling a rope by hand, the bursting head is moved hydraulically in a substantially linear direction. Subsequently, the gripper releases the cable and is returned to its original position (the return stroke) for the next pulling stroke to begin. Examples of this type of bursting system may be found in U.S. Pat. Nos. 6,305,880 and 8,702,349, both of which are assigned to the assignee of the present invention and are incorporated herein by reference.

In the foregoing type of pipe bursting apparatus, the grippers are moved by one or more hydraulic pistons to pull the cable. The force or pulling load imparted to the cable during static pipe bursting can be substantial, up to a hundred tons or even much more depending on factors such as pipe size and material, underground terrain, and cable load capacity. This is particularly true when irregularities are encountered, such as pipe connectors or valve housings, malleable materials which collapse into accordion-like segments, concrete overpours, rocky soil, and the like. Such irregularities can dramatically slow or even stall the pipe bursting process.

In some types of pipe bursting systems, the bursting head or mole is propelled by an impactor, which pushes the mole through the pipe being replaced by repetitive blows of a pneumatic hammer. Thus, the hoop stress required to burst the pipe is created by the force of the blows imparted to the bursting head by the hammer. Many of these types of systems employ a cable and winch to prevent the impactor-driven mole from straying from the pipe being replaced by following a path of least resistance instead of staying within the old pipe. In such systems, a so-called constant tension winch is frequently used to keep the cable-guided bursting head in the required orientation. The tension on the cable in operation of such systems is typically low, well under the recommended maximum operating load designated by the cable manufacturer. (Typically, manufacturers recommend a maximum operating load of 20% of the breaking strength of the cable.) Also, as mentioned above, pulling power in winch type systems is limited, for a given scale of equipment, by the drum strength of the winch and by the fact that the cable often cuts through the spooled layers. As a consequence, there is no true static bursting in such systems. Instead, the bursting is accomplished substantially entirely by the forces imparted by the hammer.

The cables typically used in pipe bursting systems are of conventional twisted wire rope which is available in different diameters and twist directions, depending on the load to be imposed on the cable. Usually, the larger the cable diameter, the greater the load it will sustain. But the greater the diameter, the heavier and stiffer the cable, making it much more difficult to handle the cable at the job site. Moreover, most cable manufacturers recommend that the cable load not exceed twenty percent of the cable's yield strength. It can be inferred that loading cables beyond that level is not desirable.

Another problem with systems relying primarily on a pneumatic hammer to supply the pipe bursting force lies with the power requirements to drive the hammer. To provide the necessary hoop stress to burst the pipe, very large compressors are needed, resulting in higher expense and unwieldiness. Ideally, for typical jobsite pipe bursting, the capacity of the compressor is at or, preferably, below that of the compressors commonly used for hand-held jackhammers. This is usually not adequate for many hammer type bursting requirements.

Static pipe bursting using hydraulic pullers offers the advantage of lighter and lower cost equipment. However, there are times when pipe fittings, pipe thickness, the nature of pipe materials, soil conditions, and/or pipe configurations, can slow or even stop the static pipe bursting process. In other words, the capacity of the hydraulic system is challenged or even exceeded. This can result in unacceptably slow bursting rates, or even in the need for further excavation to remove the offending obstruction, replacement of the cable or puller with more robust apparatus, or can even result in cable breaking.

Accordingly, there is a need for improving the static pipe bursting process and apparatus to efficiently increase their capability to deal with larger pipe, obstructions, and related issues at a low cost in money, size, and power.

SUMMARY OF THE INVENTION

The invention allows the potential energy stored in the pulling cable as a result of increasing pulling resistance to be released by using a relatively small impactor. The force of the impactor, together with the released energy stored in the cable combine to produce a reciprocating fatigue cycle stress load on the pipe being replaced. More particularly, a substantial cable load is maintained on the cable using the hydraulic cable puller while simultaneously using the impactor to impose a reciprocating stress on the pipe by the bursting head. The effect is to vary the stress imparted to the pipe by the bursting head over a range extending above and below the stress caused by the cable alone. The range of the reciprocating load spans the static load and is selected, along with the impactor frequency, to cause eventual failure of the old pipe due to cyclical fatigue.

DESCRIPTION OF DRAWINGS

FIG. 8 is a graph illustrating the variation on cable load during typical static bursting and during high loading, without the use of an impactor.

FIG. 9 is a graph illustrating the variation on cable loading during typical bursting conditions and during high loading when the impactor is employed in accordance with the invention.

FIG. 10 is a graph illustrating the variation of cable load, impactor load, and pipe stress over several cycles of the impactor.

DETAILED DESCRIPTION

Figure 1:
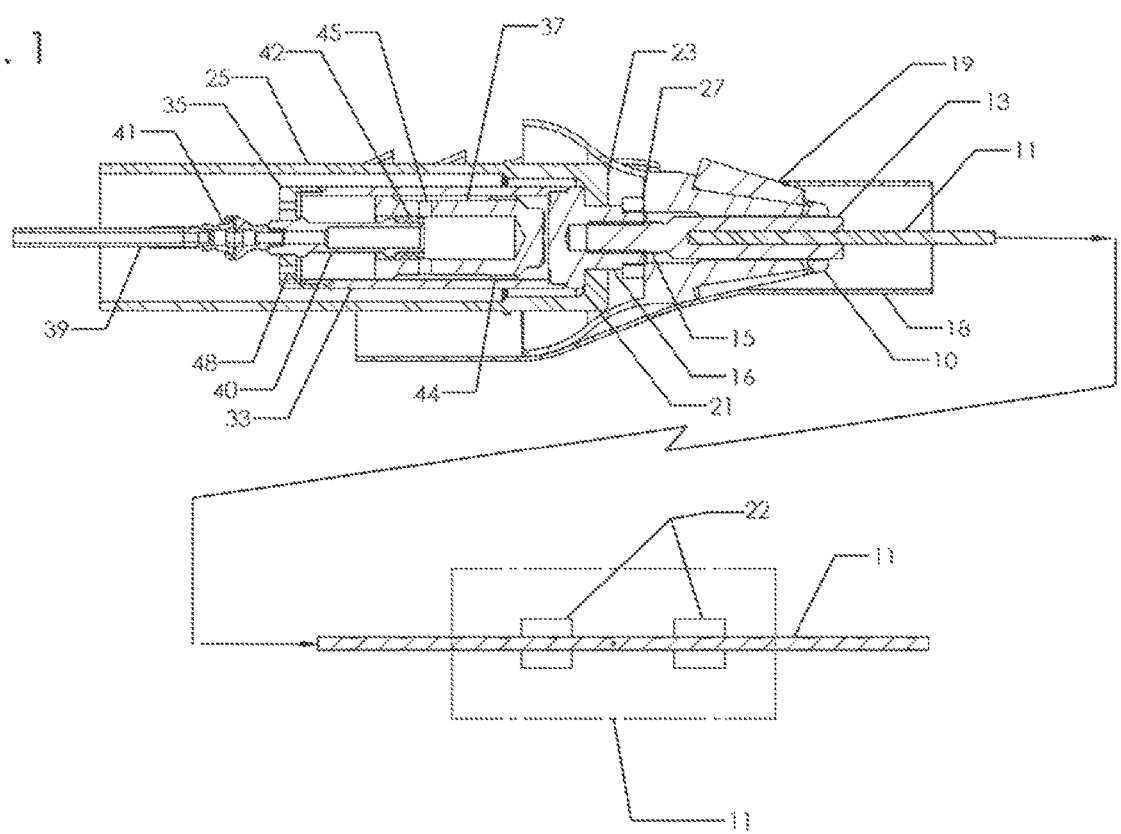
FIG. 1 is a full section schematic view of a bursting head assembly embodying the invention and useful in practicing the methods of the invention.
Figure 2:
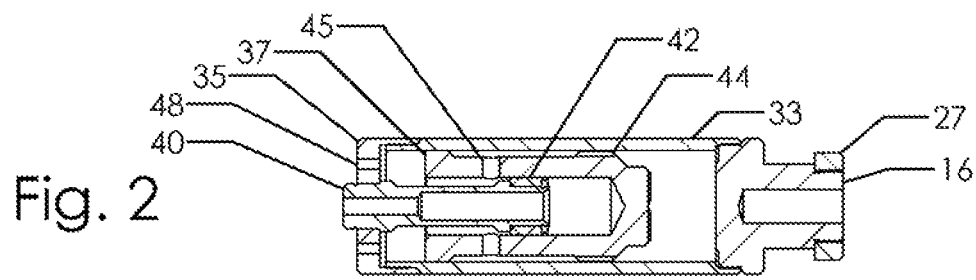
FIGS. 2-7 are full section schematic views of the impactor (pneumatic hammer) in the bursting head assembly of FIG. 1 illustrating the sequence of operation of the hammer.
Figure 3:
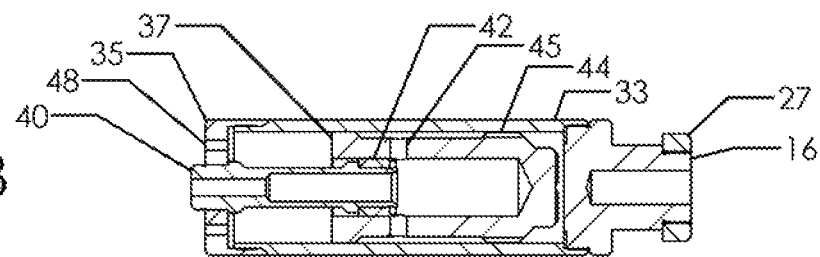

Referring now to FIG. 1, a full cross sectional view of a bursting head assembly 10 which may be useful in practicing the method of the invention is shown. The assembly 10 is pulled by a cable 11 which is attached to the bursting head assembly 10 via a cable swage 13 at a threaded projection 15, threaded into a nose 16, described more particularly below. At the front of the assembly is a bursting head 17 which, in the illustrated embodiment, has a generally frusto-conical outer shape. Such a shape imposes a radially outward force on the conduit 18 being burst when the cable 11 is pulled along its axis by a hydraulic puller 20, such as is described in the patents cited above. The grippers in the puller are shown schematically at 22 and, as described in the referenced patents, alternate gripping the cable to hold the cable for alternate pulling and holding the cable for substantially linear pulling strokes. The bursting head 17 may include irregularities, such as a cutting blade 19, for creating regions if more concentrated stress on the conduit 18.

The braided steel cable 11 is attached to the nose 16 by means of a threaded projection 15, of the threaded cable swage 13, which engages the corresponding threads in the projection 15. The bursting head slides over the projection 15 and is unsecured thereto. Thus, the bursting head is free to rotate with respect to the nose 16 and, when the cable is pulled, is pushed forward by the nose 16. The braided steel cable 11 is attached to the cable puller 20 in a substantially linear path by the cable 11. The cable puller 20 acts by hydraulic power (hydraulic power pack not pictured) to apply a pulling tension to the braided steel cable 11 by means of a reciprocating motion of the grippers 22. As described in the patents cited above, the grippers act to mechanically grab the braided steel cable 11 alternately during the pulling and return strokes.

Accordingly, the bursting head, when pulled, creates a stress on the conduit 18 which causes the conduit to rupture and spread apart, leaving a space into which a replacement conduit 25 may be drawn. In order to secure the replacement conduit 25 to the bursting head assembly, the nose 16 is provided with a collar 21 toward its rearward end, which retains cap 23 fused to the end of the replacement conduit 25. In a typical installation, the cap 23 and the replacement conduit 25 are comprised of high density polyethylene and are fused together at the job site. A retaining ring 27 is threaded on the nose 16 to hold the cap 23 in place.

As previously described, a cyclically varying force is imposed on the bursting head to cause a varying fatigue cycle to the stress acting on the conduit through the bursting head. To do this, in the preferred embodiment, a pneumatic impactor (hammer) 31 is positioned within the bursting head assembly 10.

The hammer includes a cylinder 33 which is welded, at its front end, to the nose 16. An end cap 35 is threaded onto the rear end of the cylinder. A piston 37 is contained within the cylinder 33 and slides back and forth within the cylinder subject to pneumatic pressure. Grooves 44, are provided in the outer surface of the piston 37 for venting as described below. At the forward end of its movement, the piston 37 impacts the rearward end of the nose 16, thus imparting a forward force pulse to the bursting head 16. At the rearward end of its movement, the piston strikes the end cap 35, producing a rearward force pulse to the nose and a sudden drop in the stress on the conduit. The hammer produces pulses on the stress on the conduit which are imposed on the stress produced by the cable tension. The pulses are very short, typically a very small fraction of a second. However, in this way, the stress on the conduit being replaced is varied at an amplitude and frequency sufficient to result in fatigue failure of the conduit.

In order to provide the reciprocating motion of the piston 37, the impactor is connected to a suitable source of pneumatic pressure such as an air compressor or the like, not shown. The air supply is introduced to the interior of the cylinder 33 by means of an air hose 39 trailed behind the bursting assembly within the replacement conduit. The air hose is connected to supply air to a pneumatic nozzle (core) 40, which passes through a sealed opening in the end cap 35 into the hollow interior within the piston 37, via a suitable connector 41 and supply tube 43. The piston 37 slides forward and back relative to the core 40 as the piston impacts the nose 16 and the end cap 35, respectively.

The reciprocation of the piston occurs as a result of an arrangement of exhaust ports and supply ports as follows. This will be better understood by referring to FIGS. 2-6, which show, in cross section, various stages in the operation of the impactor. The outer surface of the piston 33 is provided with a plurality of grooves 44 extending from the front of the piston to a distance before the rear end of the piston. The core 40 has a ring seal 42, preferably of fiber reinforced polyethylene, which is located at the forward end of the pneumatic core 40. Inlet/vent ports 45 are located in the cylindrical wall of the piston 37 providing an air passage between the piston's interior and, via the grooves 44, the space forward of the piston. There are a plurality of exhaust ports 48 located in the end cap.

More particularly, referring to FIGS. 2-7, the arrangement of seals, exhaust ports grooves, and vent/exhaust ports is such as to provide the timing necessary for reciprocation of the piston. The cycle begins as in FIG. 2. The sealed piston interior is supplied pneumatic pressure through the pneumatic nozzle (core) 40. The air pressure expands the sealed chamber inside the piston's 37 bore providing a forward accelerating force on the piston. The piston's forward motion relative to the ring seal 42 opens the vent port 45, (See FIG. 3) redirecting the air pressure supplied by the pneumatic core 40 from inside the piston 37 to inside the cylinder 33, forward of the piston 37, by means of a plurality of grooves 44 located longitudinally around the outside surface towards the front of the piston 37. The redirected pressure aid's the piston 37 in bouncing off of the rearward end of the nose 16 during its forward impact.

Figure 4:
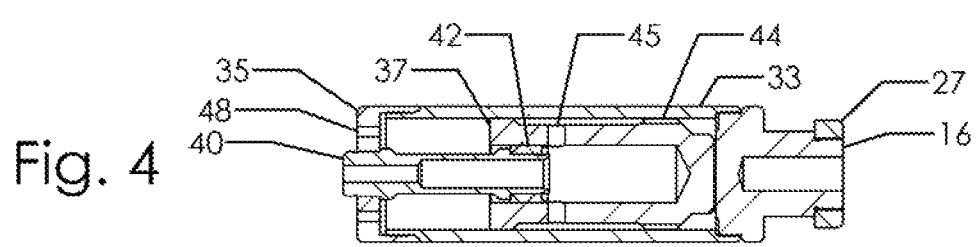
Figure 5:
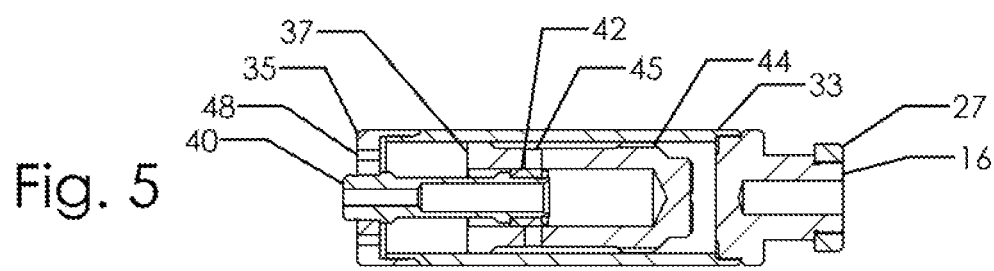
Figure 6:
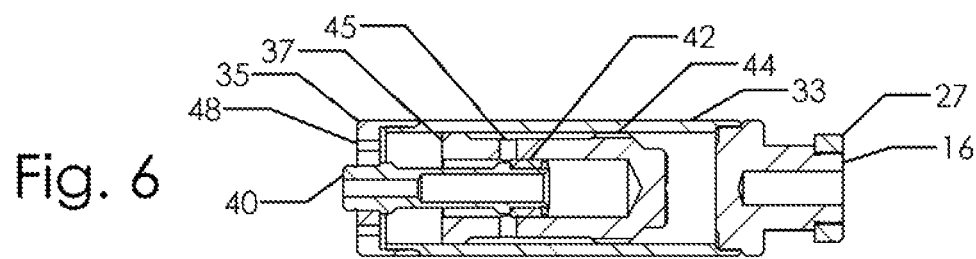
Figure 7:
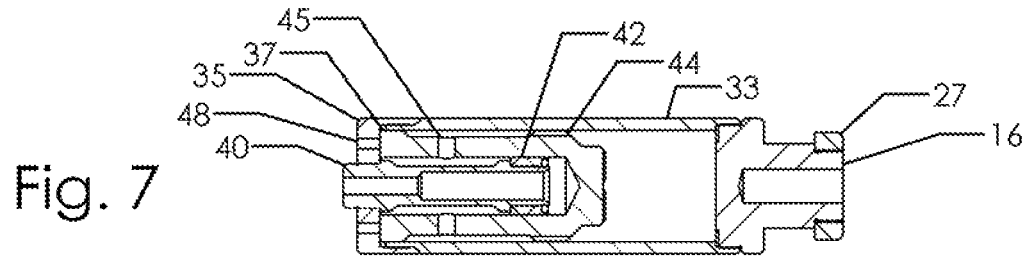

The piston's forward momentum causes an impact against the nose 16 (See FIG. 4). The piston 37 impacts the nose 16 then bounces backward, aided by pneumatic pressure through the vent ports 45. The piston's rearward momentum after its elastic impact with the nose 16 carries the piston 37 towards the rear of the impactor, closing the vent ports 45. See FIG. 5. As the vent ports 45 are sealed, the air pressure being directed into the cylinder 33 bore, forward of the piston 37, is cut off. The piston's rearward momentum and the remaining air pressure in the cylinder 33, forward of the piston 37, move the piston 37 rearward until the vent ports 45 are unsealed on the backside of ring seal 42, See FIG. 6. This allows the air pressure trapped forward of the piston 37 in the cylinder 33 to vent out of the exhaust ports 48 to the atmosphere (inside replacement pipe). The piston's rearward momentum causes an impact against the end cap 35. (See FIG. 7.) The ring seal 42 is forward of the vent ports 45, pressurizing the internal bore of the piston 37, and adding a forward accelerating force to the piston 37. The elastic component of the rearward impact between the piston 37 and back cap 35 and the pressure supplied from the pneumatic core 40 to the sealed chamber created by the ring seal 42 and the interior of the piston 37 return the piston 37 to its starting position shown in FIG. 2.

The foregoing described bursting head assembly provides significant advantages. Bursting can be accomplished at lower power and with smaller equipment for a given job. The equipment can therefor be used in tight spaces with little or no excavation required. Large or specialized equipment is not required, enabling the use of ancillary equipment such as compressors, cables etc. that are normally only suitable for relatively small jobs. It should also be noted that the pulling force of the cable is directly transferred to the impactor and that the nose of the impactor impactor pushes against the head but is not secured to it. Thus, the bursting head can be easily separated from the impactor for ease of handling.

The invention combines a substantial pull force with an impactor for bursting pipes based on low cycle fatigue fracture. During operation, the bursting head creates high stresses at several circumferential locations in the conduit being replaced depending on the shape of its surface (i.e. irregularities). When the ultimate strength of the conduit material, due to the fatigue cycle, drops below the stress being applied by the combination of the cable tension and impactor, the pipe bursts and the head advances. Because of the generally frusto-conical shape of the bursting head, the pipe is displaced radially outward.

At the beginning of a static bursting process, the pulling cable is pulled through the section of pipe to be replaced. One end of the cable is positioned in the puller and the other is secured to the bursting head. The puller is then operated to engage the bursting head with the end of the pipe to be replaced. The new pipe, which has been attached at the back of the bursting head, is pulled behind to occupy the space vacated by the pipe being replaced. The bursting head includes an impactor, preferably a pneumatic hammer, described above, which is capable of operating to provide a series of impacts to the bursting head which are alternately in opposite directions along the axis of the conduit being replaced.

Once the pull begins and the bursting head engages the conduit (pipe) to be replaced, the tension on the cable will rise due to the resistance of the old pipe and the surrounding soil. Once the hoop stress on the old pipe exceeds its breaking strength in the region in which the hoop stress is applied, the pipe begins to fracture (or split in the case of malleable material) and is pushed radially outward. If a portion of high resistance is encountered, such as a joint or coupling, or rocky soil, the tension in the cable will rise, depending on the amount of additional resistance, producing a consequent rise in the hoop stress in the high-resistance portion.

The foregoing is illustrated in FIG. 8. Cable tension begins to rise at engagement of the bursting head shown at the left portion of the graph. This quickly stabilizes as the bursting process overcomes the resistance of the pipe and surrounding soil. The right hand portion of the graph of FIG. 8 illustrates the rising cable tension when a region of high resistance is encountered. During such an occurrence, cable tension can rise rapidly, sometimes as much as ninety percent or more of the rated breaking strength of the cable. This is usually undesirable in that the pulling equipment may stall or the cable may break. In view of this, there has been a tendency in the industry to increase the power and size of pipe bursting equipment and cables.

Referring to FIG. 9, the action of the impactor is illustrated. A variable component of stress is superimposed on the stress caused by the cable. In normal conditions, illustrated on the left of FIG. 9, the effect of the impactor is slightly beneficial but could be turned off with little consequence. (In most normal conditions, the impactor usually is run constantly just for convenience.) Once a region of high resistance is encountered, as illustrated in the right hand portion of FIG. 9, and cable tension rises, the potential energy stored in the cable rises accordingly. The effect of the impactor is greatly enhanced by use of the increased stored energy in the cable due to the substantial fatigue load imposed by action of the impactor. Moreover, the impactor provides a forward impact followed by a rearward impact (both substantially along the axis of the old pipe). Thus, the stress component imposed upon the pipe by the impactor straddles the stress component imposed by the cable. The result is a very substantial low frequency fatigue cycle which results in eventual failure of the affected pipe portion.

The optimal combination of cable load, impactor force, and impactor frequency, may vary depending upon the size and thickness of the pipe, the pipe material, the nature and shape of the high resistance portion or portions, and the qualities of the surrounding soil. However, typical conditions combined with conventional compressors and pullers can be addressed on a trial and error basis in the field using the improved bursting head/impactor combination of the invention.

If the impactor is not active, the pulling force on the cable required for a satisfactory pulling rate is approximately proportional to the thickness and size of the old pipe. However, under some circumstances, the bursting rate may be too slow and may even stop entirely when regions of high resistance are encountered. Such regions may occur, for example, at locations of thick material, such as connectors or similar pipe fittings, turns in pipe direction, walls, high density or rocky soil, and analogous circumstances. By employing an impactor, the impact force introduces a fatigue load that will initiate pipe rupture with a pulling force lower than that using the pulling force alone. This enables the use of smaller and less powerful equipment.

The magnitude of the fatigue load is the effective range of the force in both directions. This is because the impactor, in addition to applying a forward force to the bursting head, has a reverse force cycle. During the forward cycle, the impact will cause a sudden increase in the stress on the pipe by adding to the energy stored in the cable. (The energy stored in the cable will have risen due to resistance of a difficult section of the pipe.). Depending on the force applied by the impactor, the energy stored in the cable, and the resistance of the pipe, the tension in the cable may fall to at or below the tension just prior to impact. At reversal of the impactor, the outward radial hoop stress on the pipe is reduced below that caused solely by the static load (as much as 90% or more of the increase at forward impact) due to the momentary reduction of static load. Thus, the hoop stress component supplied by the impactor spans the static load imposed by the cable alone. After reversal, the tension in the cable will rise as before impact. The more difficult the region of higher resistance, the more cycles will be required to break the pipe. During this time, the puller may increase the static load.

In FIG. 10, an example of the relationship of cable tension, impact force, and pipe stress over several cycles of hammer operation is depicted schematically. It is to be understood that the drawing is schematic and assumes a rigid (inelastic) system. Rigidity, however, is a reasonable assumption in taking into consideration the variables present in normal bursting set-ups and conditions. The estimates shown are based on a 7 hz hammer cycle and a 0.0007 sec. hammer pulse. Static cable pulling force is shown at approximately 16 tons. The amplitude of the fatigue load on the conduit is indicated.

In operating the system of the invention, the cable tension is allowed to rise to a level substantially in excess of 65% of rated cable breaking strength, preferably in excess of 70%. By doing so, more full advantage is taken from the energy stored in the cable. It is preferred that the type of cable used be IWRC (independent wire rope core) compact sweged cable. This type of cable is better suited to hydraulic gripper type pullers, and has a high breaking strength to enable pulling loads of a hundred tons or more. The tendency of such cables to rotate in use may be avoided by using a threaded connection of a hand opposing the tendency and allowing the nose to rotate with respect to the bursting head.

During operation the bursting head creates high stresses at several circumferential locations depending on the shape of the bursting head, irregularities thereon, and the conduit. When the stress exceeds the ultimate strength of the pipe material, the pipe bursts and the head advances and displaces the pipe both axially and radially. If there is no impactor, the required pulling force is approximately proportional to the thickness and size of the pipe, which can be very high at locations of thick material. Fracture stops if the pulling force is not high enough.

With an impactor, the impact force introduces a fatigue load that will initiate fracture with a pulling force lower than that using the pulling force alone. The magnitude of the fatigue load is the effective range of the force in both directions. In the system of the invention, the pulling force is usually high enough to cause local plastic deformation. The fracture associated with the fatigue load usually requires only a few number of cycles of impacts. Therefore, the fracture is due to low-cycle fatigue. A more continuous fracture will occur when the thickness is uniform. At difficult locations, it will take more cycles to break, which allows time for the puller to reach its maximum load.

To appreciate the dependence of the impact load range on the pulling force, an analysis was conducted based on an air pressure impactor operating at 120 psi (with 5% loss) and a frequency of 3 Hz. The magnitude of the impact force transmitted to the nose was estimated to be (34745 lbs. and −33956 lbs.). The table below shows a comparison of the impact force range for different cable diameters and pulling forces (20% and 50% of cable breaking strength). The lowermost table shows the impact force range and the ratio of the impact force range to the pulling force.

| cable diameter | breaking strength (BS) | Pulling forces for 20% BS | Pulling forces for 50% BS |
|---|---|---|---|
| 5/8" | 22.7 tons | 9080 lbs | 22700 lbs |
| 3/4" | 32.3 tons | 12920 lbs | 32300 lbs |
| 7/8" | 43.8 tons | 17520 lbs | 43800 lbs |
| 1 1/8" | 71.5 tons | 28600 lbs | 71500 lbs |
| 1 1/4" | 87.9 tons | 35160 lbs | 87900 lbs |

Impact force for:

| cable diameter | breaking strength (BS) | Impact force range 20% BS | Impact force range 50% BS | ratio |
|---|---|---|---|---|
| 5/8" | 22.7 tons | 43825 lbs | 57445 lbs | 1.31 |
| 3/4" | 32.3 tons | 47665 lbs | 67045 lbs | 1.41 |
| 7/8" | 43.8 tons | 52265 lbs | 68701 lbs | 1.31 |
| 1 1/8" | 71.5 tons | 63345 lbs | 68701 lbs | 1.08 |
| 1 1/4" | 87.9 tons | 68701 lbs | 68701 lbs | 1.0 |

The variation of the tension on the cable is related to the impact forces from the impactor. However, for the forward impact, the magnitude of variation depends on how much resistance is encountered from the pipe. If the resistance is very stiff (no fracture), the forward impact will only reduce the cable tension very little. The reverse impact will lead to a direct decrease in the force on the conduit and a consequent decrease in the stress. In summary, the invention will increase the steady (or average) pipe bursting speed for the same cable force. It will cut or burst difficult sections with less cable tension. The ability of cutting or bursting difficult pipe sections is not achieved solely by using a larger force on the cable but by increasing the cable force and imposing a reciprocating stress on the static stress on the pipe imparted by the cable. For the same cable size, use of a hammer according to the invention is more efficient. And for the same cable size, the present invention achieves improved efficiency by using both a small low-power impactor and a high cable tension.

Various modifications and other embodiments of the invention may become apparent to those skilled in the art from the foregoing description and accompanying drawings and are intended to fall within the scope of the following claims.

What is claimed is:

1. A method of replacing underground conduit wherein an existing conduit is ruptured and expanded to create a space, and wherein a replacement conduit is introduced to occupy the space, said method comprising;
    employing a hydraulic cable puller system having a cable puller gripping a wire cable attached to a bursting head shaped to apply a radially outward stress to the existing conduit when the cable is placed under tension by the cable puller, wherein the cable tension is not constant;
    allowing the tension in the cable to increase substantially to store potential energy therein and substantially increase the stress on the replacement conduit in the region of engagement with the bursting head, and
    imposing a series of mechanical force pulses to the bursting head along the axis of the cable to repetitively increase and decrease the potential energy in the cable to impose a cyclically variable stress component in the region of engagement sufficient to cause fatigue failure of the conduit.

2. The method of claim 1 wherein the cyclical variable stress component straddles the stress level produced by the action of the cable puller.

3. The method of claim 1 wherein the cable tension is cyclically increased substantially above forty percent of the breaking strength of the cable.

4. The method of claim 1 wherein the cable tension is cyclically increased to at least seventy percent of the breaking strength of the cable.

5. A method for operating a static pipe bursting system in which a cable puller imposes a pulling force on a wire cable attached to a bursting head wherein the pulling force constitutes the primary source of bursting energy for the bursting head to engage and rupture conduit to be replaced, said method comprising:
    increasing the tension in the cable substantially above twenty percent of the rated breaking strength of the cable to store potential energy therein and substantially increase the stress on the conduit to be replaced in the region of engagement with the bursting head, and
    imposing a series of mechanical force pulses to the bursting head substantially along the axis of the cable to repetitively increase and decrease the potential energy in the cable to impose a cyclically variable stress component in the region of engagement sufficient to cause fatigue failure of the conduit;
    wherein the potential energy in the cable is periodically increased and decreased during operation of the static pipe bursting system.

* * * * *